(12) United States Patent
Fernandes et al.

(10) Patent No.: US 9,208,508 B1
(45) Date of Patent: Dec. 8, 2015

(54) DISTRIBUTING CONTENT

(75) Inventors: Roshan Fernandes, Mumbai (IN); Bindu Oommen Fernandes, Hyderabad (IN)

(73) Assignee: Google Inc., Mountain View, CA (US)

( * ) Notice: Subject to any disclaimer, the term of this patent is extended or adjusted under 35 U.S.C. 154(b) by 1048 days.

(21) Appl. No.: 13/171,842

(22) Filed: Jun. 29, 2011

(51) Int. Cl.
*G06Q 30/02* (2012.01)
(52) U.S. Cl.
CPC ........ *G06Q 30/0251* (2013.01); *G06Q 30/0241* (2013.01); *G06Q 30/0275* (2013.01)
(58) Field of Classification Search
CPC .......... G06Q 30/0241; G06Q 30/0251; G06Q 30/0275
USPC .......................................................... 709/217
See application file for complete search history.

(56) References Cited

U.S. PATENT DOCUMENTS

| | | | |
|---|---|---|---|
| 2008/0147497 A1* | 6/2008 | Tischer | 705/14 |
| 2010/0122282 A1 | 5/2010 | DuBose | |
| 2011/0191800 A1 | 8/2011 | Makowski, Jr. et al. | |
| 2011/0258049 A1* | 10/2011 | Ramer et al. | 705/14.66 |
| 2012/0192220 A1 | 7/2012 | Wyatt et al. | |

* cited by examiner

*Primary Examiner* — Suraj Joshi
(74) *Attorney, Agent, or Firm* — Fish & Richardson P.C.

(57) ABSTRACT

Content items are distributed in content item distribution slots that define a period of time. A purchaser of a content item distribution slot can select one or more content items to distribute in the slot based on information regarding an individual to whom a content item is distributed in the content item distribution slot.

20 Claims, 3 Drawing Sheets

DISTRIBUTING CONTENT

TECHNICAL FIELD

This disclosure relates to distributing content.

BACKGROUND

In many different environments, content providers want to distribute content to selected recipients and/or recipients that meet selected criteria. For example, advertisers want to distribute their advertisements to advertisement slots where the advertisements will be effective in communicating information to potential customers, and when the advertisements will lead to desired activity, such as a purchase of the advertiser's goods or services. In some instances, a content provider may rely on contextual information when making decisions regarding content distribution slot selections. For example, an advertiser may want to advertise goods and/or services relating to travel in travel magazines, on travel web sites, or during travel television programs. A content provider may also rely on targeting information, such as demographic information of potential viewers, when making content distribution selections. Additionally, content providers can rely on performance information regarding results achieved by previous content distribution selections.

SUMMARY

In many on-demand content distribution environments where users receive content based on a request, such as the Internet and on-demand television distribution systems, advertisers and other providers of content items distribute content items, such as advertisements, based on contextual information regarding content with which the content items will be distributed. Content items are also distributed based on information regarding the user requesting the content and/or the request itself. For example, advertisements can be distributed on web pages based on the content of the web page on which the advertisements will appear, as well as based on the individual user requesting the web page. In many implementations, advertisements and other content items are distributed on a per-request basis, such that when content, such as a web page, is requested, one or more content items, such as advertisements, are selected for distribution to the individual that requested the content. If the individual requests different content, such as by following a link to another page of a web site, one or more second content items are selected for distribution to the individual along with the requested different content.

Distribution of content items on such a per-request basis may not account for a variance in user interaction with an on-demand content distribution system. For example, a user may navigate to a home page for a publisher, such as a news provider, in order to conveniently access a link to desired content, such as one of the publisher's web pages that is associated with sports news or financial news. In this example, the user makes two requests for content, each of which could trigger a content item selection and distribution. In some instances, different content items may be selected and distributed in response to the two separate requests for content. For example, an advertisement associated with a sporting goods store may be selected for distribution with the publisher's sports news web page, whereas a different advertisement may have been selected for distribution with the publisher's home page.

In this example, the user may have only viewed the publisher's home page for the time needed to locate and activate the link to the publisher's sports page, and the user may not have viewed, and may not have had any interest in viewing, the advertisement distributed with the publisher's home page. In contrast, the user may have viewed the publisher's sports page for a long period of time, during which the user may have viewed, or may have had more opportunity to view, the advertisement distributed with the publisher's sports page. Thus, the value to the user, and the value to the advertiser, of the distribution of the advertisement with the publisher's home page differs from the value to the user, and the value to the advertiser, of the distribution of the advertisement distributed with the publisher's sports page. In some systems, it may be difficult for publishers, content item providers, content distribution system operators, and/or content requestors to optimize the value associated with distribution of content items due to many factors, such as the navigational purpose of the content request.

Distributing content items based on pre-defined time periods can, for example, enable a content item provider to ensure that a user will receive the same content item when visiting multiple pages of a website within a pre-defined period of time. Additionally, distributing content items based on pre-defined time periods can enable content item providers to make better use of resources, and can enable distribution of more relevant content items to users. For example, a content item provider, such as a toy retailer, may not wish to distribute content items, such as advertisements for toys, to a given location during a certain time when the target audience is not likely to access content available at the location, such as during a school day when children are likely to be in school and not likely to view the advertisements.

In some implementations, content items can be distributed on a per-time basis such that similar requests for content result in distribution of similar content items with the requested content. For example, advertisement slots on a first group of web pages, such as a first web site, may be purchased by advertisers in blocks of time, such as fifteen minute blocks of time. During each block of time, each visitor to the first web site will receive an advertisement provided by the advertiser associated with the block of time. Thus, regardless of the number of different pages requested by the visitors during a given period of time, the one or more advertisements selected by the advertiser who is associated with the given period of time will be shown to all visitors and, for example, on all pages of the first website for the duration of the first period of time.

The per-time basis of content item distribution can also be used in combination with other content item targeting techniques. For example, the advertisement slots of the first web site can be sold to different advertisers for the same period of time based on the geographic location of the visitor.

In one aspect, a method includes receiving a request for a content item, the request including information regarding a content item distribution slot associated with the request, identifying a time period associated with the request, accessing, by one or more processors, content item distribution information regarding content item groups associated with the content item distribution slot, identifying, by one or more processors based on the time period, a first content item group associated with the content item distribution slot, selecting, by one or more processors, a content item associated with the first content item group and associated with content item distribution slot, and providing, in response to the request, information regarding the selected content item for distribution of the selected content in association with the content item distribution slot.

In another aspect, a system includes a receiver that receives a request for a content item, the request including information regarding a content item distribution slot associated with the request, at least one storage device storing content item distribution information regarding content item groups associated with the content item distribution slot, and at least one processor that identifies a time period associated with the request, accesses the content item distribution information, identifies a first content item group associated with the content item distribution slot based on the time period, selects a content item associated with the first content item group and associated with content item distribution slot, and provides, in response to the request, information regarding the selected content item for distribution of the selected content in association with the content item distribution slot.

In another aspect, a method includes receiving a request for an advertisement, the request including information regarding content with which the advertisement is to be provided and time information, identifying, by one or more processors, an advertiser that is associated with the content for a time period that includes a time indicated by the time information, selecting, by one or more processors, an advertisement associated with the identified advertiser and associated with the content, and providing information regarding the selected advertisement.

In another aspect, a method includes providing, by an online advertisement distribution system at a first time, a first advertisement to a first user accessing first content, the first content being available at a first online location, the first online location being included in a first group of online locations, and the first time being included in a first pre-defined period of time, providing, by the online advertisement distribution system at a second time, the first advertisement to the first user accessing second content, the second content being available at a second online location, the second online location being included in the first group of online locations, and the second time being included in the first pre-defined period of time, and providing, by the online advertisement distribution system at a third time, a second advertisement to the first user accessing content available at a location included in the first group of online locations, the second time not being included in the first pre-defined period of time.

In another aspect, a method includes accessing content item distribution information regarding one or more content items, the content item distribution information including payment information for one or more pre-defined time periods and targeting information identifying one or more content item distribution slots, associating, by one or more processors, the one or more content items with at least one of the one or more content item distribution slots for one or more pre-defined time periods, and storing information regarding an association between the one or more content items with at least one of the one or more content item distribution slots for the one or more pre-defined time periods for use in distributing the one or more content items to the one or more content item distribution slots.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Content items can be distributed to entities (e.g., an individual) in response to requests for content generated by the entity based on content item providers associated with the requested content and pre-defined time periods. For example, one or more advertisements can be distributed to a user in response to a request for a web page based on a time period in which the request is generated and/or a time period in which the advertisement is delivered to the user for rendering. Thus, content item providers can select content with which they wish their content items to be distributed during one or more of the pre-defined time periods.

Figure 1:
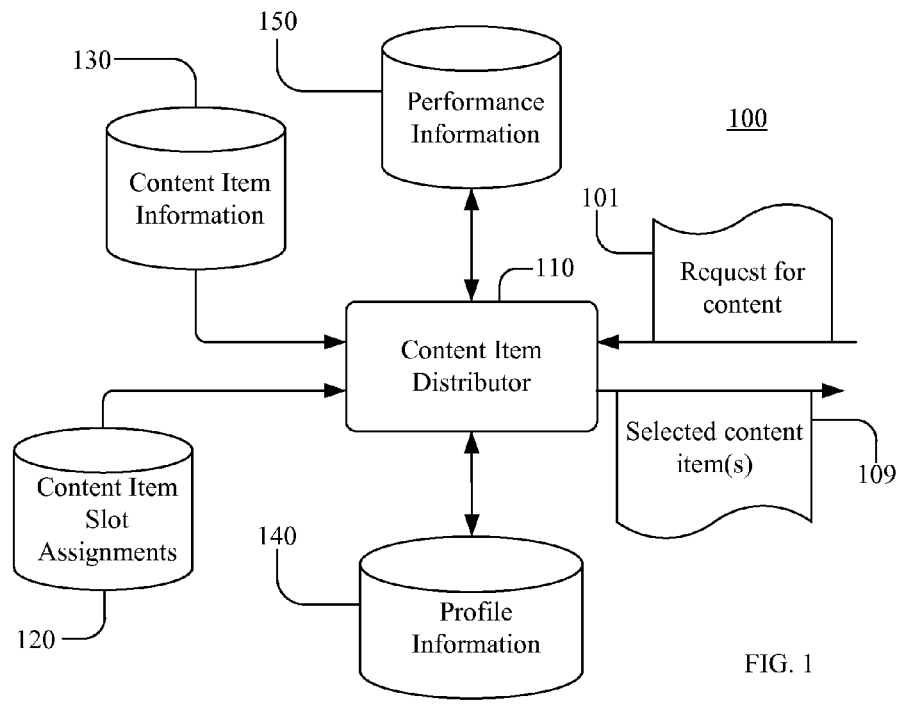
FIGS. 1 and 2 are diagrams of systems for distributing content.

Referring to FIG. 1, a system 100 receives information regarding a request for content 101, such as a user request for a web page, and provides information regarding one or more selected content items 109, such as advertisements, to be distributed to the user with the requested content. The system 100 includes a content item distributor 110 that receives the information regarding the request for content 101 and provides the information regarding one or more selected content items 109. The system also includes a content item distribution slot assignment information repository 120, a content item information repository 130, a user profile information repository 140, and a content item performance information repository 150.

Figure 7:
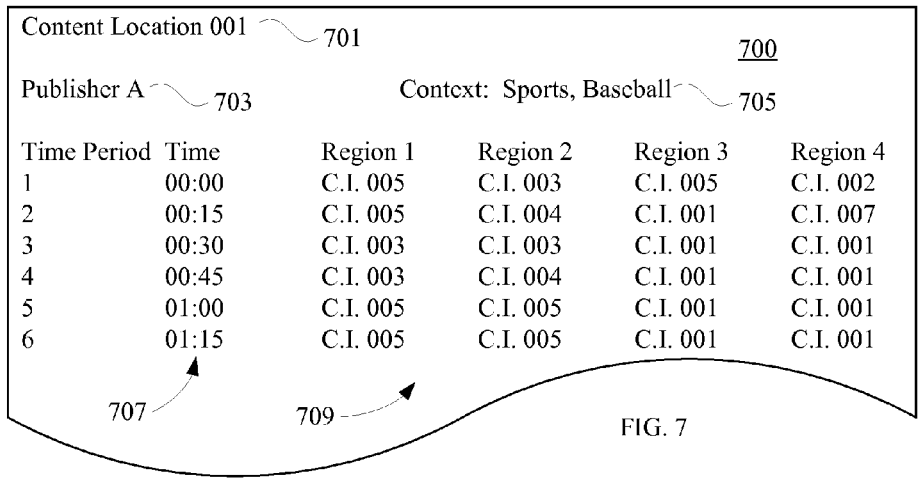
FIGS. 7 and 8 are diagrams of data structures for use in distributing content.

The content item distribution slot assignment information repository 120 stores information regarding content item providers associated with content item distribution slots for pre-defined time periods. For example, as shown in FIG. 7, the content item distribution slot assignment information repository 120 can include a data structure 700 including information for each content item distribution slot, such as each advertisement slot. The data structure 700 includes information identifying a specific content item distribution slot 701, information regarding a content provider associated with the specific content item distribution slot 703, and context information 705 for content associated with the specific content item distribution slot Additionally, the data structure 700 includes, for each pre-defined time period, information regarding a time associated with the pre-defined time period 707 and information regarding a content item provider associated with the specific content item distribution slot for one or more pre-defined geographic region 709. As illustrated, the specific content item distribution slot, "content location 001", is provided by the content provider "publisher A", and is associated with content provided by publisher A that relates to sports and/or baseball. The data structure 700 includes pre-defined time periods of 15 minute blocks of time and four regions, Region 1, Region 2, Region 3, and Region 4.

As also shown in FIG. 7, a first content item or content item group, C.I. 001, is associated with the content location 001 for Region 3 for time periods 2-6, and is associated with the content location 001 for Region 4 for time periods 3-6. A second content item or content item group, C.I. 002, is associated with the content location 001 for the fourth region for the first time period. Thus, a content item associated with the first content item or content item group C.I. 001 will be selected for distribution in the content item distribution slot associated with content location 001 in response to all requests for content associated with Region 3 from 12:15 to 1:29.59. Similarly, a specific content item or content item group is associated with the content location 001 for each region for each time period and content items associated with the identified content items or content item groups will be distributed in the content distribution slot in response to requests for content associated with the corresponding region and time.

Figure 8:
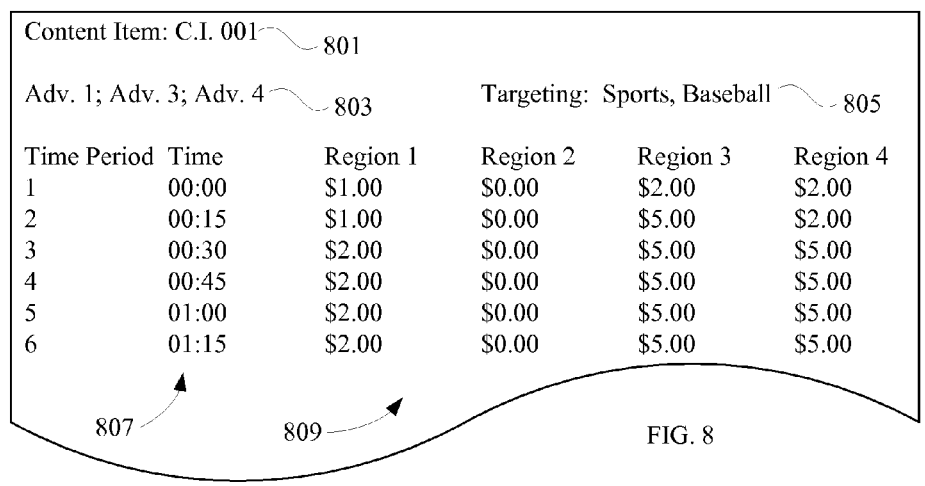

The content item information repository 130 stores distribution information regarding specific content items or groups of specific content items. The distribution information can be provided by, or on behalf of, a content item provider that is associated with the specific content items or groups of specific content items and can be used to determine whether the specific content items or groups of specific content items are associated with the content item distribution slots of the of the content item distribution slot assignment information repository 120. For example, as shown in FIG. 8, the content item information repository 130 can include a data structure 800 that includes information for each content item or group of content items. The data structure 800 includes information identifying a specific content item group 801, information regarding specific content items, such as advertisements, included in the advertisement group 803, and context targeting information 805. Additionally, the data structure 800 includes information regarding a time associated with the pre-defined time periods 807 and information regarding a price 809 that the content provider is willing to pay to have the specific content items distributed to content distribution slots that match the content targeting information 805.

As illustrated in FIG. 8, advertisement group 803 of the content item group C.I. 001 includes three advertisements, Adv. 1, Adv. 3, and Adv. 4, and is targeted to content item distribution slots that are associated with content that relates to sports and/or baseball, as specified in content targeting information 805. The price information 809 can be used by a content item distribution system, such as an advertisement distribution system, to determine which content item group is to be associated with each region for each time period for each content item distribution slot. For example, the price information 809 can be used in an auction system that selects a winning content item group from among content item groups that include content targeting information 805 that matches the context information 705 for a content item distribution slot. In some implementations, the price information 809 can be used by the content providers associated with the content item groups that have context targeting information 805 that matches the context information 705 for their content item distribution slots. In some implementations, the content item provider can manually select content item distribution slots to which the content items of the content item group can be distributed.

The user profile information repository 140 includes information regarding users. For example, among other information, the user profile information repository 140 includes information regarding geographic locations associated with users. In some implementations, user default locations (e.g. home or office locations) can be included in the user profile information repository 140. The user default locations can be used by the content item distributor to identify a region associated with a request for content 101 associated with a user. Similarly, a current location can be determined from information associated with a request for content 101 and the current location can be used to identify a region associated with the request. If available, the user profile information repository can also include demographic information such as age or gender, interest information regarding topics of interest to the user, information regarding historical activity of the user, such as browsing history or purchase history, or other information regarding the users. The user profile information can be anonymous, anonymized, generic, and/or personally identifiable information. The user can control whether personally identifiable information is collected, and, if collected, whether the personally identifiable information is anonymized. For example, if by default, user profile information is not collected, users can opt-in to profile information collection and/or use.

The content item performance information repository 150 includes historical information regarding prior distribution of content items. The historical information can be used by the content item distributor 110 in selecting one or more content items 109 to send to a user in response to a request for content 101. For example, the content item performance information repository 150 can include information regarding a historical click-through rate, a historical conversion rate, or other content item distribution performance metric. In some implementations, the historical information can be determined based on the region of the user to which the content items were sent.

Figure 4:
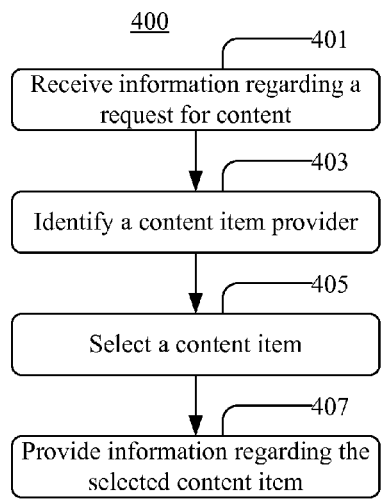
FIGS. 4, 5 and 6 are diagrams of processes for distributing content.

In use, and with reference to FIG. 4, the content item distributor 110 receives the information regarding a request for content 101 (401). In response to receiving the request for content 101, the content item distributor 110 identifies a content item provider (403). For example, the content item distributor 110 can identify the content item provider based on the requested content and a time period, such as a time period including the current time (i.e., the time at which the information regarding the request for content is received). After identifying the content item provider, the content item distributor 110 selects a content item associated with the identified content item provider (405) and provides information regarding the selected content item (407). For example, the content item distributor 110 can select a content item associated with the content item provider and transmit information regarding the selected content item to the user associated with the request for content 101.

Figure 2:
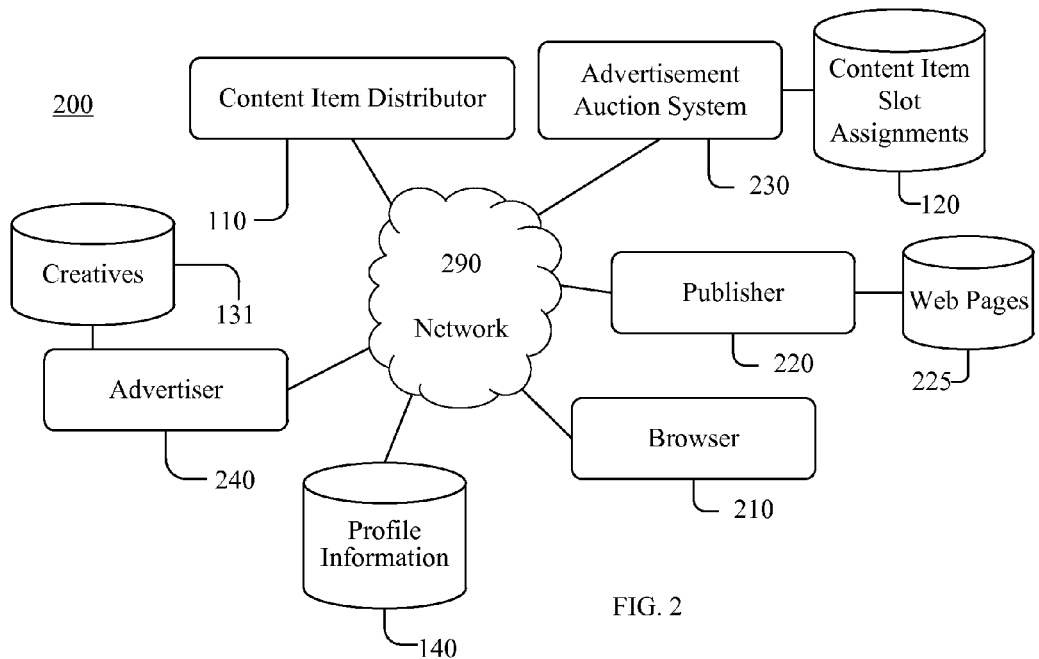

Now referring to FIG. 2, a system 200 for distributing advertisements includes the content item distributor 110 that is operable to distribute advertisement creatives 131 to a browser 210 via a network 290, such as the Internet. The browser 210 can be a web browser application running on a user computer and the user can navigate to selected web pages to view content available at the web pages. In some implementations, the browser can be another application that accesses content via the network 290, or that requests advertisements for display with local content. The advertisement creatives 131 are provided by advertisers, such as an advertiser 240, and are stored in the content item information repository 130. In some implementations, each advertiser maintains a content item information repository. Alternatively, advertisement creatives 131 of one or more advertisers can be maintained in a content item information repository maintained by the content item distributor 110. The advertisement creatives 131 are distributed to content item distribution slots included in the web pages or other content provided by a publisher 220, which are stored in a web page repository 225.

An advertisement auction system 230 is also included in the system 200 and is operable to select one or more advertisers from among multiple advertisers bidding for association with content item distribution slots or groups of content item distribution slots for each time period. The advertisement auction system 230 creates and maintains the content item distribution slot assignment information repository 120 based on, among other things, bids received from advertisers, such as the advertiser 240. For example, the advertisement auction system 230 can access distribution information of the advertiser 240 regarding bids for associating an advertisement creative or group of advertisement creatives (e.g., one or more advertisement creatives selected from the advertisement creatives 131) with one or more advertisement slots.

In some implementations, the advertisement auction system 230 can determine whether a bid of the advertiser 240 is accepted based on the bid price. Additionally, the advertisement auction system can determine whether a bid of the advertiser 240 is accepted based on performance information, context information, quality information, or other signals in order to optimize revenue, optimize user satisfaction, or achieve a desired balance of these and other considerations. For example, a bid price of an advertiser may be compared directly to the bid prices of other advertisers for a particular advertisement slot or group of advertisement slots. Additionally, the bid price can be adjusted based on a contextual relevance of the advertisement(s) and content associated with the advertisement slot, based on historical performance information associated with the advertisement(s), based on a preference of a publisher, and/or based on other information. The adjusted bid price can be compared with adjusted bid prices of competing advertisers. In some implementations, a reservation system can be included instead of, or in addition to, the advertisement auction system 230. In the reservation system, advertisements or groups of advertisements are associated with time periods for advertisement slots without competition with other advertisers. For example, the reservation system can simply associate advertisements with time periods for advertisement slots based on an advertiser agreeing to pay a purchase price set by a publisher.

The advertisement slots can also be grouped for common association with one or more advertisements or advertisement groups. Thus, advertisement slots at a particular location for two or more web pages of a web site can be grouped together for association with the same advertisement or group of advertisements. For example, all advertisement slots having the same position on a news publisher's web site, or all advertisements slots having the same position within a sports section of the news publisher's web site, can be grouped together. In some implementations, advertisement slots can be grouped together according to other criteria in addition to or instead of the position and context criteria discussed in the example above.

Figure 5:
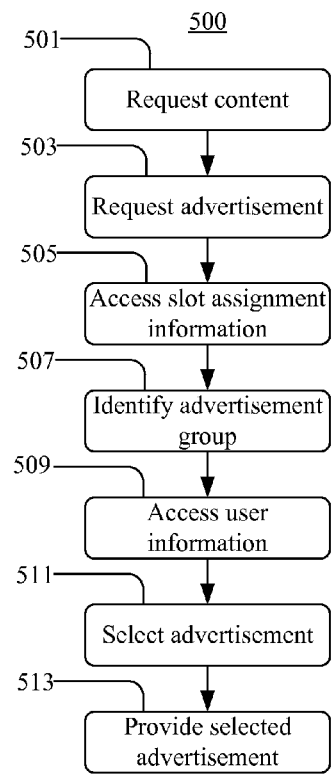

In use, and with reference to FIG. 5, the system 200 is operable to provide an advertisement to a user according to a process 500. For example, when a user requests a web page from a publisher using the browser 210 (501), a server associated with the web page responds to the request by transmitting information to the browser 210 that enables display of the web page. If the web page includes an advertisement slot, a request for an advertisement is sent to the content item distributor 110 (503). For example, the web page can include computer program code that causes the browser 210 to generate the request for an advertisement to display in the advertisement slot. Alternatively, the server can generate the request for the advertisement in response to receiving the request for the web page.

After receiving the request for the advertisement, the content item distributor 110 identifies the advertisement slot associated with the request and identifies a user profile and/or a location associated with the request for the advertisement. For example, if the browser generates the request based on processing the web page, the request can include information identifying a user profile associated with the user and/or a location of the user. The content item distributor 110 then accesses the content item distribution slot assignment information (505) to identify an advertisement or a group of advertisements associated with the time period that includes the current time and associated with the region that includes the user's location (507).

If the identified advertisement group includes information regarding two or more advertisement creatives, the content item distributor can also access user information, such as demographic information or historical information, associated with the user profile (509). Based on the user information, the content item distributor 110 selects one of the two or more advertisement creatives for distribution in response to the request (511). Additionally, the content item distributor 110 can access the performance information for use in selecting one of the two or more advertisement creatives. For example, the performance information can include a click-through rate or other performance information for each of the advertisement creatives included in the identified advertisement group and the content item distributor 110 can select the advertisement creative based in part on a determination of which advertisement creative is most likely to be clicked by the user. If only one advertisement creative is included in the advertisement group, then the content item distributor 110 selects the advertisement creative of the advertisement group for distribution in response to the request.

After selecting the advertisement creative, the content item distributor provides the selected advertisement (513). For example, the content item distributor 110 can transmit instructions to the browser 210 to retrieve the advertisement creative from the advertiser 240. Alternatively, the content item distributor 110 can send the creative directly to the browser 210 for rendering.

Figure 6:
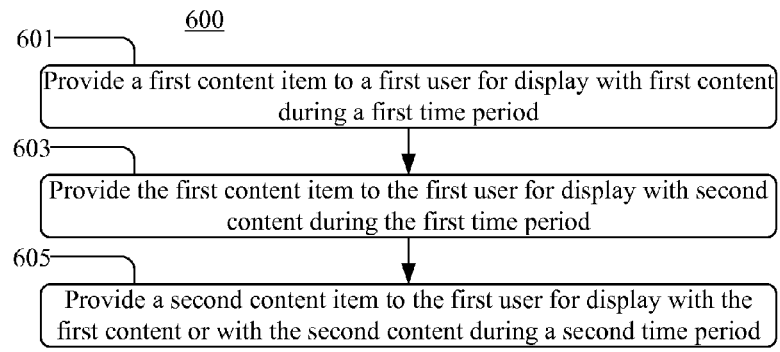

As discussed above, the request for the advertisement can include information regarding a group of advertisement slots. For example, a group of web pages, such as a web site, or a portion of a web site, can include multiple advertisement slots, and the advertisement slots of the group of web pages can be configured to receive the same advertisement within a time period. For example, each web page of a first web site can include an advertisement slot for a graphic advertisement at the same location and the content item distributor 110 can select advertisement creatives for distribution to the advertisement slots as a group. As a result, as illustrated in the process 600 of FIG. 6, when a first user requests a first web page of the web site, the content item distributor 110 provides a first content item to the first user for display with the first web page based on the first user's location and based on the time period including the time of the request of the first web page or the time of the request for an advertisement (601). For example, the content item distributor 110 can provide the first advertisement creative according to the process 500, or according to another process using the time period. If the first user requests a second web page of the web site during the first time period, the content item distributor 110 provides the first advertisement to the first user for display with the second web page (603).

In some implementations, because the first user's location is the same, the time period is the same, the advertisement slot group is the same, and the first user's profile information is the same, the content item distributor 110 selects the same (i.e., the first) advertisement. In some implementations, the content item distributor 110 can be configured to provide the first advertisement to the first user in response to subsequent requests associated with other web pages of the web site during the first time period without performing the process used to select the first advertisement in response to the first request for an advertisement. In other words, once the content item distributor 110 selects the first advertisement for an advertisement slot group for the first user for the first time period, the content item distributor can automatically select the first advertisement in response to subsequent advertisement requests associated with the first user, the advertisement slot group, and the first time period to ensure that the first user consistently receives the first advertisement during the first time period regardless of navigation within the web site.

If the user navigates to a page of the web site, or if the user continues to view one of the pages of the website during a second time period, the content item distributor 110 provides a second advertisement to the user for display with the pages of the web site during the second time period (605). In particular, the second advertisement also can be selected according to the process 500, or another process, based on an advertisement group associated with the advertisement slot group for the second time period.

Figure 3:
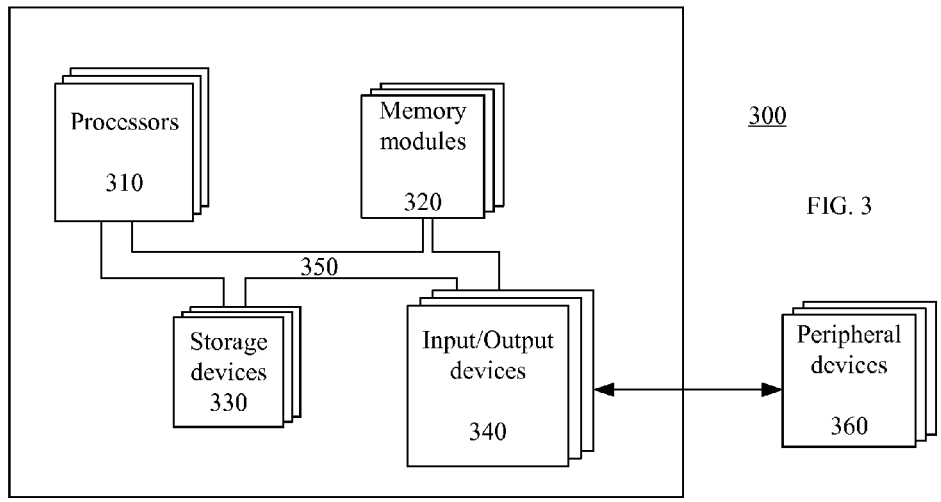
FIG. 3 is a diagram of a computer system.

Now referring to FIG. 3, a computer system 300 includes one or more processors 310, one or more memory modules 320, one or more storage devices 330, one or more input/output devices 340, and a system bus 350. The one or more input/output devices 340 are operable with one or more peripheral devices 360 for inputting signals to and/or for receiving signals from the computer system 300. One or more of the input/output devices 340 can be operable to allow the computer system 300 to communicate with one or more other computer systems or computer system components over a computer network, such as the network 290 of FIG. 2, which can include the Internet and/or other communications networks. For example, the browser 210 can implemented in a personal computer and can be configured to communicate with one or more other computers or components thereof through one or more input/output devices. The personal computer can also be configured to display content to a user via video display devices, audio output devices, and/or haptic output devices. Similarly, the content item distributor 110 can be implemented in a computer that is configured to interact with one or more local or remote storage devices that include the content item slot assignment information, the content item distribution information, the user profile information, and/or the performance information.

While some implementations are described above, these should not be viewed as exhaustive or limiting, but rather should be viewed as exemplary, and included to provide descriptions of various features. It will be understood that various modifications may be made without departing from the spirit and scope of this disclosure. For example, the steps of the processes described above can be performed in orders different from those described in or implied by the disclosure. Additionally, operations described with respect to one or more components of the systems described in the disclosure can be performed by different components and/or by two or more components. Similarly, individual components of the systems described in the disclosure can be combined in one or more other components or can be composed of multiple separate sub-components.

Accordingly, other implementations are within the scope of the following claims.

The invention claimed is:

1. A method comprising:
receiving, by one or more processing devices, multiple requests for content items for a plurality of Web pages of a Web site published by a computing device of a publisher, the multiple requests comprising information regarding one or more content item distribution slots on at least two of the plurality of Web pages for the content items, the one or more content item distribution slots being associated with the multiple requests, an identity of the publisher, and context information regarding a subject of the plurality of Web pages;

identifying, by one or more processing devices, one or more time periods associated with the multiple requests, each time period encompassing a time during which a content item is to be delivered for output in the one or more content item distribution slots to a computing device of a user;

accessing, by one or more processing devices, content item distribution information regarding content item groups associated with the one or more content item distribution slots, the content item groups being associated with blocks of time during which content items in the content item groups can be output in response to the multiple requests;

identifying, by one or more processing devices, a first content item group among the content item groups, the identifying being based on a first time period associated with a first request of the multiple requests and on information in the first request;

selecting, by one or more processing devices, a first content item associated with the first content item group for the one or more content item distribution slots on at least two of the plurality of Web pages of the Web site during the first time period;

identifying, by one or more processing devices, a second content item group among the content item groups, the identifying being based on a second time period associated with a second request of the multiple requests and on information in the second request;

selecting, by one or more processing devices, a second content item associated with the second content item group for the one or more content item distribution slots on at least two of the one or more Web pages of the Web site during the second time period; and providing, in response to the multiple requests and to the computing device of the user, information regarding the first and second content items selected for distribution in the one or more content item distribution slots.

2. The method of claim 1, wherein a content item distribution slot is in a first group of content item distribution locations, and wherein the content item selected for distribution is associated with the first group of content item distribution locations.

3. The method of claim 1, wherein the first content item selected for distribution is selected from among two or more candidate content items that are associated with the first content item group and associated with the one or more content item distribution slots on at least two of the plurality of Web pages of the Web site.

4. The method of claim 3, wherein selecting includes selecting the first content item from among the candidate content items based, at least in part, on information regarding a user profile associated with the first request.

5. The method of claim 4, wherein selecting the first content item from among the candidate content items is based, at least in part, on distribution information associated with the candidate content items.

6. The method of claim 1, wherein the information in the multiple requests comprises a location of the computing device of the user.

7. The method of claim 1, wherein the one or more content item distribution slots is associated with online content.

8. The method of claim 1, wherein the first content item selected includes advertising content.

9. A system comprising:
- at least one storage device storing instructions that are executable; and
- at least one processing device to execute the instructions to perform operations comprising:
  - receiving multiple requests for content items for a plurality of Web pages of a Web site published by a computing device of a publisher, the multiple requests comprising information regarding one or more content item distribution slots on at least two of the plurality of Web pages for the content items, the one or more content item distribution slots being associated with the multiple requests, an identity of the publisher, and context information regarding a subject of the plurality of Web pages;
  - identifying one or more time periods associated with the multiple requests, each time period encompassing a time during which a content item is to be delivered for output in the one or more content item distribution slots to a computing device of a user;
  - accessing content item distribution information regarding content item groups associated with the one or more content item distribution slots, the content item groups being associated with blocks of time during which content items in the content item groups can be output in response to the multiple requests;
  - identifying a first content item group among the content item groups, the identifying being based on a first time period associated with a first request of the multiple requests and on the information in the first request;
  - selecting, a first content item associated with the first content item group for the one or more content item distribution slots on at least two of the plurality of Web pages of the Web site during the first time period;
  - identifying a second content item group among the content item groups, the identifying being based on a second time period associated with a second request of the multiple requests and on information in the second request;
  - selecting a second content item associated with the second content item group for the one or more content item distribution slots on at least two of the one or more Web pages of the Web site during the second time period; and
  - providing, in response to the multiple requests and to the computing device of the user, information regarding the first and second content items selected for distribution in the one or more content item distribution slots.

10. The system of claim 9, wherein the information in the multiple requests comprises a location of the computing device of the user.

11. The system of claim 9, wherein a content item distribution slot is included in a first group of content item distribution locations, and wherein the content item selected for distribution is associated with the first group of content item distribution locations.

12. The system of claim 11, wherein the content item selected is selected from among two or more candidate content items that are associated with the first content item group and that are associated with a content item distribution location.

13. One or more computer storage devices storing instructions that are executable by one or more processing devices to perform operations comprising:
- receiving, by the one or more processing devices, multiple requests for content items for a plurality of Web pages of a Web site published by a computing device of a publisher, the multiple requests comprising information regarding one or more content item distribution slots on at least two of the plurality of Web pages for the content items, the one or more content item distribution slots being associated with the multiple requests, an identity of the publisher, and context information regarding a subject of the plurality of Web pages;
- identifying, by the one or more processing devices, one or more time periods associated with the multiple requests, each time period encompassing a time during which a content item is to be delivered for output in the one or more content item distribution slots to a computing device of a user;
- accessing, by the one or more processing devices, content item distribution information regarding content item groups associated with the one or more content item distribution slots, the content item groups being associated with blocks of time during which content items in the content item groups can be output in response to the multiple requests;
- identifying, by the one or more processing devices, a first content item group among the content item groups, the identifying being based on a first time period associated with a first request of the multiple requests and on information in the first request;
- selecting, by the one or more processing devices, a first content item associated with the first content item group for the one or more content item distribution slots on at least two of the plurality of Web pages of the Web site during the first time period;
- identifying, by the one or more processing devices, a second content item group among the content item groups, the identifying being based on a second time period associated with a second request of the multiple requests and on information in the second request;
- selecting, by the one or more processing devices, a second content item associated with the second content item group for the one or more content item distribution slots on at least two of the one or more Web pages of the Web site during the second time period; and
- providing, in response to the multiple requests and to the computing device of the user, information regarding the first and second content items selected for distribution in the one or more content item distribution slots.

14. The one or more computer storage devices of claim 13, wherein a content item distribution slot is in a first group of content item distribution locations, and wherein the content item selected for distribution is associated with the first group of content item distribution locations.

15. The one or more computer storage devices of claim 13, wherein the first content item selected for distribution is selected from among two or more candidate content items that are associated with the first content item group and associated with the one or more content item distribution slots on at least two of the plurality of Web pages of the Web site.

16. The one or more computer storage devices of claim 15, wherein selecting includes selecting the first content item from among the candidate content items based, at least in part, on information regarding a user profile associated with the first request.

17. The one or more computer storage devices of claim 16, wherein selecting the first content item from among the candidate content items is based, at least in part, on distribution information associated with the candidate content items.

18. The one or more computer storage devices of claim 13, wherein the information in the multiple requests comprises a location of the computing device of the user.

19. The one or more computer storage devices of claim 13, wherein the one or more content item distribution slots is associated with online content.

20. The one or more computer storage devices of claim 13, wherein the first content item selected includes advertising content.

* * * * *